United States Patent [19]

Catch

[11] Patent Number: 4,886,420
[45] Date of Patent: Dec. 12, 1989

[54] PROTECTED FLOW METER ROTOR BEARING

[75] Inventor: John B. Catch, Longmont, Colo.

[73] Assignee: Engineering Measurments Company, Longmont, Colo.

[21] Appl. No.: 204,879

[22] Filed: Jun. 10, 1988

[51] Int. Cl.$^4$ .............................................. F03B 11/06
[52] U.S. Cl. ................................ 416/174; 416/146 A; 415/171.1
[58] Field of Search .......................... 416/174, 146 A; 73/861.91, 861.92; 415/170 B, 171.1

[56] References Cited

U.S. PATENT DOCUMENTS

| | | | |
|---|---|---|---|
| 3,164,020 | 1/1965 | Groner et al. | 73/861.92 X |
| 3,534,602 | 10/1970 | Boyd | 73/861.92 X |
| 3,762,359 | 10/1973 | Jones | 416/146 A X |
| 4,021,143 | 5/1977 | May | 416/146 A X |
| 4,122,717 | 10/1978 | Loesch | 73/861.92 |
| 4,333,355 | 6/1982 | Dacus et al. | 73/861.91 |
| 4,400,134 | 8/1983 | Sweeney | 415/66 X |
| 4,648,281 | 3/1987 | Morita et al. | 415/142 X |

FOREIGN PATENT DOCUMENTS

| | | | |
|---|---|---|---|
| 947583 | 7/1949 | France | 416/146 A |
| 370862 | 9/1963 | Switzerland | 416/186 R |

OTHER PUBLICATIONS

Roots-Dresser brochure, Single-Stage Centrifugal Compressors.

Primary Examiner—Everette A. Powell, Jr.
Attorney, Agent, or Firm—James R. Young

[57] ABSTRACT

A protected, but unsealed rotor bearing for flowmeter turbine rotors and the like has an annular shoulder protruding axially from the rotor in concentric relation to the rotor axis in a manner that defines a cavity protruding axially into the rotor. An elongated bearing body with a cylindrical peripheral surface is mounted in a supporting frame and protrudes axially into the cavity. An axle on which the rotor is mounted protrudes into a bore in the bearing body such that the bearing interface is between the surface of the axle and the surface of the bore in the bearing body. A ball in the bore between the bearing body and the axle bears axial thrust. The peripheral surface of the bearing body does not contact the annular shoulder, but a face on the annular sholder that extends radially outward from adjacent the peripheral surface of the bearing body acts as a centrifugal flinger to dynamically divert contaminant particles away from the bearing surfaces.

8 Claims, 2 Drawing Sheets

PROTECTED FLOW METER ROTOR BEARING

BACKGROUND OF THE INVENTION

1. Field of the Invention

The present invention is related to precision journal bearings, and more specifically to a precision journal bearing intended to operate in, yet be protected from, highly abrasive and contaminated fluids.

2. State of the Prior Art

Fluid flow meters for measuring the rate of flow of fluids are often constructed with turbine-type rotors journaled in a frame and having curved or dynamically twisted, radially extending vanes that are driven by a flowing fluid. Since the rate of rotation of the rotor driven by the flowing fluid is desired to be as close to directly proportional to the rate of fluid flow as possible for accurate, useful flow rate measurements, the journal bearing has to have almost no friction or drag. Thus, seals or completely enclosed bearings are not practical. Yet, grit, particulate matter, and other contaminants in the flowing fluid can be extremely detrimental to open rotor bearings. For example, flow meter rotors that will function normally and without trouble for years in fluids that do not have particulate matter greater than about 25 microns and nominal concentrations in the range of about 125-1000 ppm will quit working in only a matter of several days when operating in particle laden fluids, such as coke slurries and the like.

Therefore, there is a significant need for a small, precision journal bearing structure for flow meter rotors that is not sealed, yet which can continue operating without disintegrating or jamming in fluids or slurries having high particulate concentrations and contaminants.

SUMMARY OF THE INVENTION

Accordingly, it is a general object of the present invention to provide a journal bearing structure for a precision rotor that is not sealed, yet which is protected from invasion by particulate matter in slurries and other particulate-laden or contaminated fluids.

A more specific object of the present invention is to provide an unsealed structure that isolates a precision journal bearing from particulates in fluids by a combination of physical remoteness from the fluid stream and dynamic particulate diversion.

Additional objects, advantages, and novel features of the invention shall be set forth in part in the description that follows and in part will become apparent to those skilled in the art upon examination of the following description and accompanying drawings or may be learned by the practice of the invention. The objects and the advantages of the invention may be realized and obtained by means of the instrumentalities and in combinations particularly pointed out in the appended claims.

The apparatus of this invention can include an annular shoulder protruding axially from the rotor in concentric relation with the rotor axis in such a manner that said annular shoulder defines a cavity protruding axially into the side of the rotor and concentric with the rotor axis. An elongated bearing body is mounted in the frame and has a distal end protruding into the cavity in the side of the rotor such that the annular shoulder surrounds said distal end of said bearing body with a very close clearance therebetween. The bearing body also has an axial bearing bore extending into its distal end to receive an elongated axle protruding axially outward from said rotor through said cavity and into said bearing bore. The outer surface of the annular shoulder is flat and extends radially outward from the bearing body and, when rotating, acts to fling particles radially outward and creates a minor radial flow that interacts with the main stream flow to smooth the main stream flow over the bearing structure while diverting particles away from the bearing surfaces.

BRIEF DESCRIPTION OF THE DRAWINGS

The accompanying drawings, which are incorporated in and form a part of the specification illustrate the preferred embodiments of the present invention, and together with the description serve to explain the principles of the invention. In the drawings.

DETAILED DESCRIPTION OF THE PREFERRED EMBODIMENTS

Figure 1:
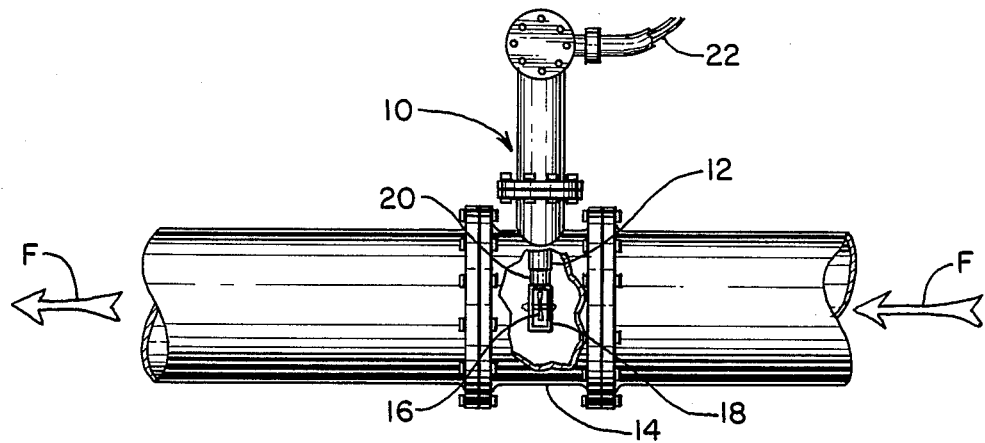
FIG. 1 is an elevation view of a pipe line with a flow meter rotor positioned in the pipe line for measuring the flow of fluid in the pipe, a part of the sidewall of the flow meter coupling being cut away to show the assembly of the rotor journaled in the frame at the head of the meter apparatus.
Figure 2:
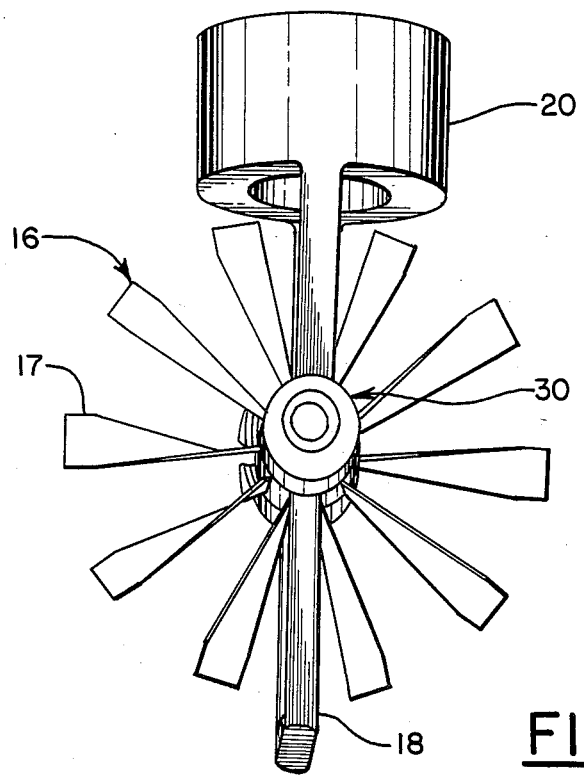
FIG. 2 is a perspective view of the flow meter rotor journaled in a frame at the head of the flow meter apparatus.

A flow meter assembly 10 is shown in FIG. 1 positioned in a pipeline P. A fluid flowing through the pipeline P is indicated by the arrows F. The flow meter assembly 10 is generally comprised of a probe 12 inserted into the fluid flow F generally through an appropriate coupling body 14. The rotor 16 is journaled in a frame 18 at the bottom of the probe 12 and has a plurality of radially extending vanes 17 (best seen in FIG. 2) that interact with the flowing fluid to impart a rotary motion to the rotor 16. The angular velocity of the rotary motion is a function of, and preferably varies in direct relation to, the linear velocity of the flowing fluid F. A suitable transducer, such as a magnetically responsive coil (not shown), can be mounted in the cup 20 at the top of the frame 18 to generate electronic signals in response to the motion of, for example, magnetic vanes 17 as they pass in close proximity to the cup 20. Such electronic signals are, of course, indicative of the angular velocity of the rotor and can be fed through appropriate wire leads 22 or other signal transmission means to processing means (not shown) to generate an output of the fluid flow velocity or, with appropriate calculations well-known to persons skilled in this art, volumetric flow rate of the fluid flowing in the pipeline P.

Figure 3:
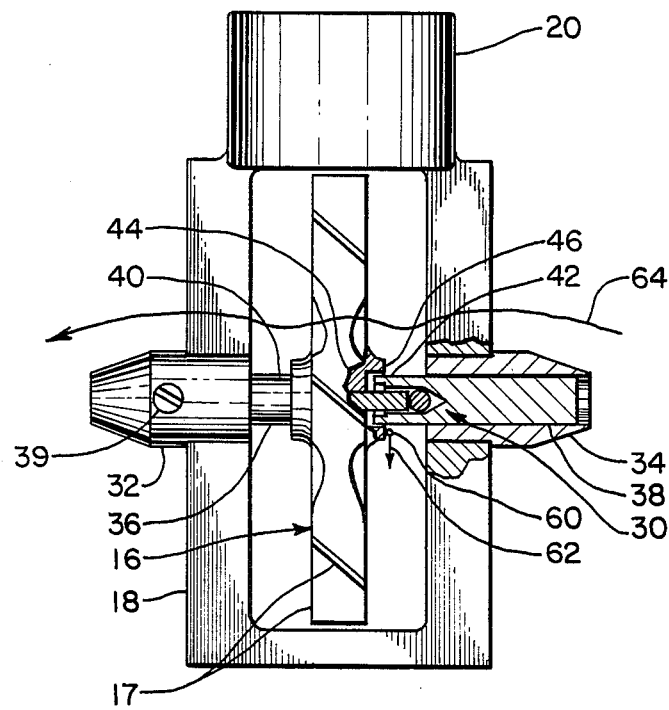
FIG. 3 is a side elevation view of the rotor and frame assembly with the hub and bearing on one side of the rotor in cross-section to show the details of the protected precision bearing structure of the present invention.
Figure 4:
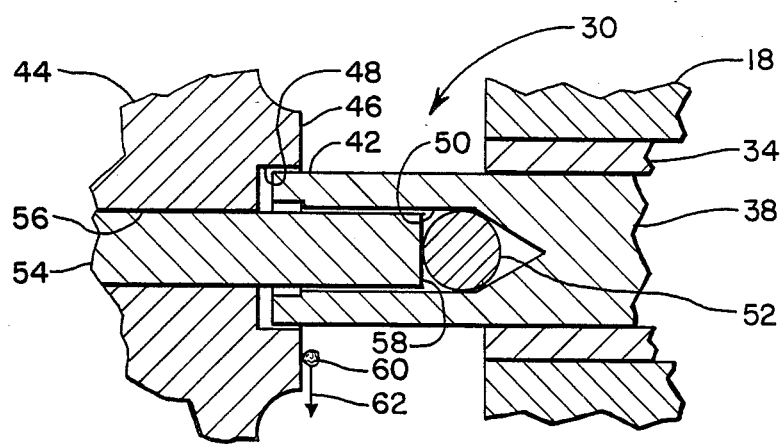
FIG. 4 is an enlarged cross-sectional view of the bearing structure according to this invention.

As best seen in FIGS. 3 and 4, the protected, non-sealed bearing assembly 30 includes a pair of sleeves 32, 34 attached to the frame 18. An elongated cylindrical bearing rod 36, 38 is inserted into each respective sleeve 32, 34 and retained therein by conventional means, such as the set screw 39. The bearing rods 36, 38 are preferably long enough to extend inwardly from the sleeves 32, 34 and frame 18 to distal ends 40, 42 adjacent the hub 44 of rotor 16.

At this point, the description of components will be confined for convenience to the front side of the rotor 16 that is shown in cross-section in FIG. 3 and enlarged in FIG. 4, although it is understood that the bearing components in the back side are the same, but in mirror image to those on the front side. Therefore, the following description, while emphasizing the front side bearing components, is also understood to describe the rear side bearing components as well.

The hub 44 of the rotor 16 has an axially protruding shoulder 46 that extends over the distal end 42 of bearing 38. A bore 48 extends axially into the shoulder 46 so that the distal end 42 of the bearing 38 actually extends a short distance into the hub 44. The bearing 38 has a bore 50 extending axially into its distal end 42. A hard ball 52 is positioned (preferably pressed) in the bearing bore 50. An axle shaft 54 is pressed into a bore 56 through hub 44 and extends rotatably into the bearing bore 50. The distal end 58 of axle 54 in contact with the ball 52 defines the limit of axial movement of the axle 54 in bearing bore 50, and the ball 52 provides a near point contact with the axle 54 to minimize friction. Therefore, the axle 54 is retained in the bearing 38 in a journaled manner so that it can rotate freely therein while being restrained from axial movement.

The actual bearing surface is the axle 54 in rotatable contact with the inside surface of the bearing 38 in bore 50. Therefore, it is that surface that has to be kept free of particles and other debris or contaminants to continue functioning without undue wear or jamming.

As best seen in FIGS. 3 and 4, a particle would have to travel a very tortuous path to get into the actual bearing contact of axle 54 in bore 50. It would first have to get between the shoulder 46 and distal end 42 of bearing 38. Then it would have to reverse direction and move back into bore 50. While that path at first glance may not appear to be informidable, it is made more so by the fluid and particle dynamics imparted by the shoulder 46. As the rotor 16 rotates, the shoulder 46 tends to fling fluid and any particulates that contact it radially outward, as illustrated by particle 60 and accompanying direction indicating arrow 62. The result is that a minute fluid dynamic flow and particulate flow is imparted radially outward from the distal end 42 of bearing 38, which carries particles away from the small clearance between shoulder 46 and distal end 42. This minute dynamic fluid motion imparted by the rotating shoulder 46 also interacts with the main fluid stream flow to smooth and streamline it over the bearing assembly 30 and through the rotor 16, as generally illustrated by the arrow 64 in FIG. 3.

The operational result of this bearing assembly 30 in flow meter rotor apparatus has been shown to keep a flow meter rotor operable continuously for many months in such adverse conditions as coke slurries, digester gas, landfill gas, and other highly contaminated fluid flow applications where conventional flow meter rotor bearings were failing after only several days of operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalence may be resorted to falling within the scope of the invention as defined by the claims which follow.

The embodiments of the invention in which an exclusive property or privilege is claimed are defined as follows:

1. In flow meter turbine rotor apparatus having a rotor with a hub journaled in a frame and a plurality of vanes extending radially outward from the hub for insertion in a stream of flowing fluid, the improvement comprising:

an elongated bearing rod having a proximal end attached to said rotor and a cylindrical peripheral surface extending to said distal end, said rotor having an annular shoulder protruding axially outward from said hub in a manner that defines a cavity in the side of said rotor into which said distal end of said bearing rod protrudes such that said annular shoulder is surrounding, but not contacting, a portion of the peripheral surface of said bearing rod that is adjacent said distal end, said annular shoulder having a flat outer surface that extends radially outward from said portion of said peripheral surface that is adjacent said distal end of said bearing rod, and said bearing rod having an axial bearing bore extending into its distal end; and an axle protruding axially outward from said hub into said bearing bore, said axle being rotatably retained in said bearing bore.

2. The improvement of claim 1, including a convex outwardly curved surface in said bearing bore for contacting the distal end of said axle and restraining said axle against axial movement in said bearing bore.

3. The improvement of claim 2, wherein said curved surface is defined by a generally spherical body positioned in said bearing bore.

4. The improvement of claim 3, wherein said spherical body is press-fit into said bearing bore so that it is immovable in relation to said bearing rod.

5. Rotor bearing apparatus for a rotor journaled in a frame, comprising:

an annular shoulder protruding axially from the rotor in concentric relation with the rotor axis in such a manner that said annular shoulder defines a cavity protruding axially into the side of the rotor and concentric with the rotor axis;

an elongated bearing body having a proximal end mounted in the frame and a cylindrical peripheral surface extending to a distal end protruding into said cavity in the side of the rotor such that said annular shoulder surrounds a portion of said peripheral surface that is adjacent said distal end with a very close clearance therebetween, said bearing also having an axial bearing bore extending into its distal end; and an elongated axle protruding axially outward from said rotor through said cavity and into said bearing bore.

6. The improvement of claim 5, including a convex outwardly curved surface in said bearing bore for contacting the distal end of said axle and restraining said axle against axial movement in said bearing bore.

7. The improvement of claim 6, wherein said curved surface is defined by a generally spherical body positioned in said bearing bore.

8. The improvement of claim 7, wherein said spherical body is press-fit into said bearing bore so that it is immovable in relation to said bearing rod.

* * * * *